United States Patent
Uchida

(10) Patent No.: US 10,885,408 B2
(45) Date of Patent: Jan. 5, 2021

(54) DOCUMENT GENERATION SYSTEM, METHOD OF CONTROLLING THE SAME, AND NON-TRANSITORY COMPUTER READABLE MEDIUM

(71) Applicant: CANON KABUSHIKI KAISHA, Tokyo (JP)

(72) Inventor: Takayuki Uchida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/601,776

(22) Filed: Oct. 15, 2019

(65) Prior Publication Data

US 2020/0125903 A1 Apr. 23, 2020

(30) Foreign Application Priority Data

Oct. 22, 2018 (JP) .................................. 2018-198710

(51) Int. Cl.
| | |
|---|---|
| *G06F 40/103* | (2020.01) |
| *G06K 15/02* | (2006.01) |
| *G06F 40/174* | (2020.01) |
| *G06F 40/186* | (2020.01) |

(52) U.S. Cl.
CPC ....... *G06K 15/1848* (2013.01); *G06F 40/174* (2020.01); *G06F 40/186* (2020.01); *G06K 15/1894* (2013.01); *G06K 2215/0077* (2013.01)

(58) Field of Classification Search
USPC ....... 358/1.1–3.29, 1.11–1.18; 715/221, 222, 715/239, 248–255, 738
See application file for complete search history.

(56) References Cited

U.S. PATENT DOCUMENTS

| | | | |
|---|---|---|---|
| 7,161,711 B2 | 1/2007 | Mori | |
| 2005/0137883 A1* | 6/2005 | Nohgawa | G06Q 10/10 358/1.1 |
| 2009/0225365 A1* | 9/2009 | Hayakawa | G06K 17/00 358/1.15 |
| 2013/0198600 A1* | 8/2013 | Lockhart | G06Q 30/0254 715/230 |
| 2015/0207945 A1* | 7/2015 | Odaira | H04N 1/32096 358/1.15 |
| 2018/0101525 A1* | 4/2018 | Hirata | G06F 16/93 |
| 2018/0121066 A1* | 5/2018 | Kato | G06F 3/04845 |

FOREIGN PATENT DOCUMENTS

JP 2002063000 A 2/2002

\* cited by examiner

*Primary Examiner* — Marcellus J Augustin
(74) *Attorney, Agent, or Firm* — Rossi, Kimms & McDowell LLP

(57) ABSTRACT

A document generation system generates a plurality of form data of a first file format from document data; converts the plurality of form data of the first file format into a plurality of form data of a second file format; causes a display unit to display the plurality of form data of the converted second file format so as to be able to accept a storage request; and, in response to accepting a storage request for the plurality of form data of the second file format displayed on the display unit, combines the plurality of form data of the first file format corresponding to the plurality of form data of the second file format into data of the first file format and store the combined data in a storage unit.

9 Claims, 15 Drawing Sheets

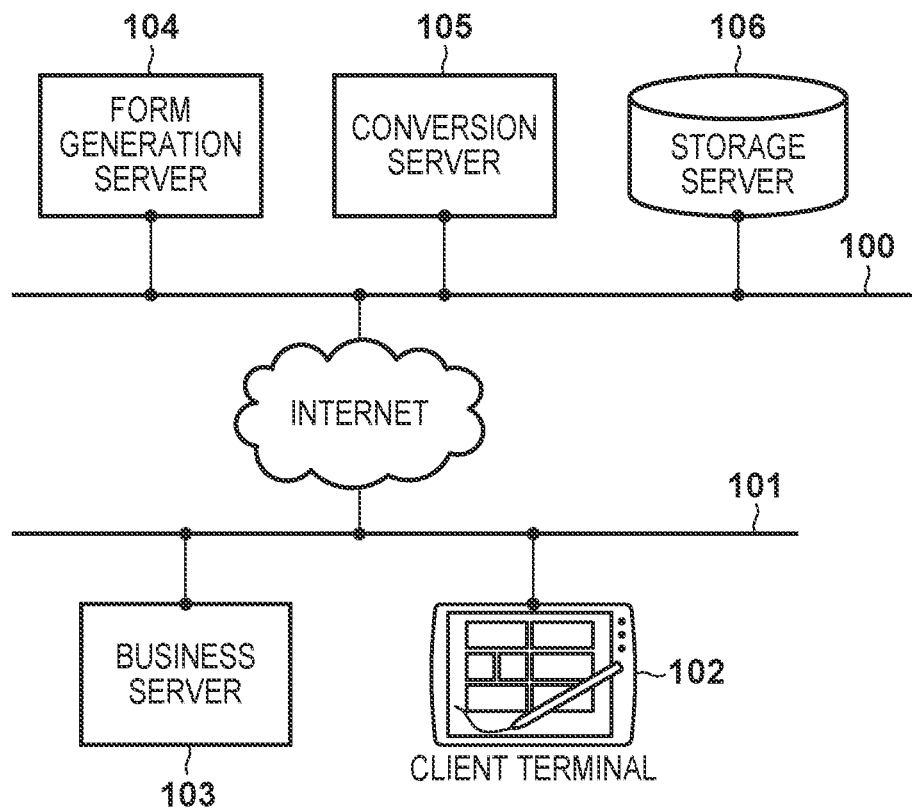
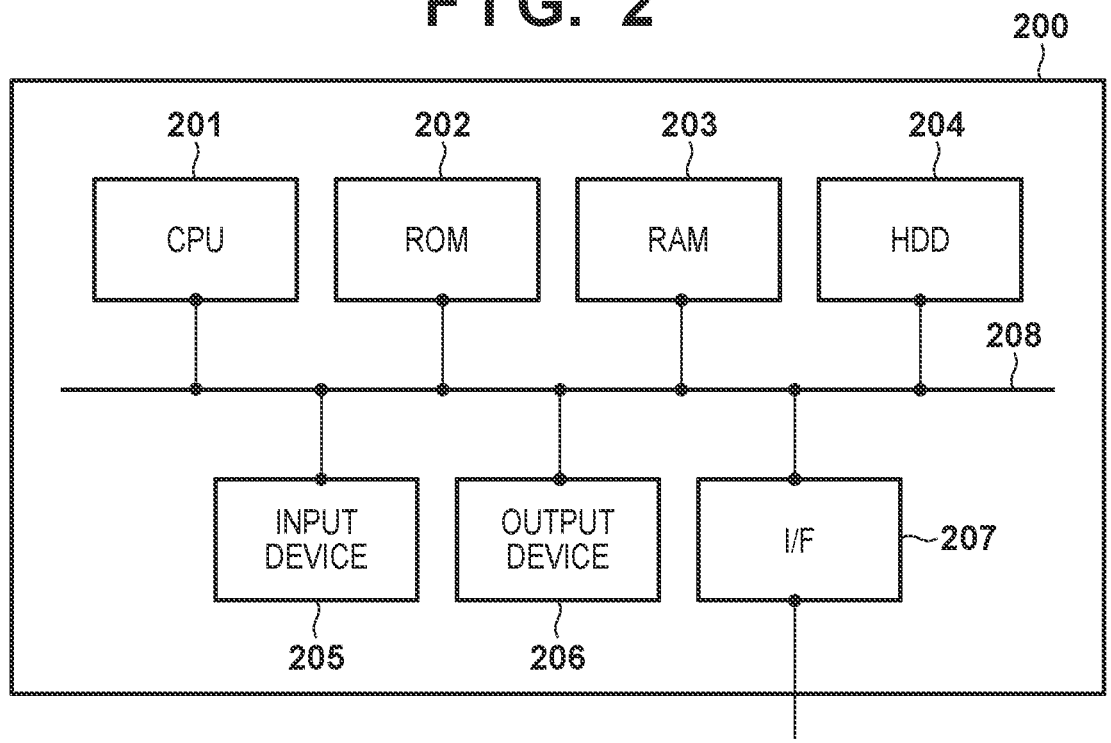

FIG. 6

```
{
  "dataList" : [],
  "end" : false
}
```
600

```
{
  "dataList" : [
    "https://storage.com/form/overlay-111/pdf/data-1.pdf"
  ],
  "end" : false
}
```
610

```
{
  "dataList" : [
    "https://storage.com/form/overlay-111/pdf/data-1.pdf",
    "https://storage.com/form/overlay-111/pdf/data-2.pdf"
  ],
  "end" : false
}
```
620

```
{
  "dataList" : [
    "https://storage.com/form/overlay-111/pdf/data-1.pdf",
    "https://storage.com/form/overlay-111/pdf/data-2pdf",
    "https://storage.com/form/overlay-111/pdf/data-3.pdf"
  ],
  "end" : true
}
```
630

FIG. 9

CUSTOMER INFORMATION SYSTEM - MR. FORM TARO

NAME: FORM TARO
ADDRESS: XXX PREFECTURE XXX CITY 1-2-3
BIRTH DATE: 1989/01/01
CONTACT: 090-9999-9999

FORM SELECTION: PLAN DESIGN DOCUMENT A
PLAN DESIGN DOCUMENT B
QUOTATION
...

Preview

FIG. 10

BUSINESS FORM SERVICE - Web View

STORE  1/3

DESIGN DOCUMENT PLAN A    MR. FORM TARO

BASIC PLAN 1,000
MEDICAL INSURANCE 2,000
RIDER A 1,000

TOTAL 9,000- yyy
xxxx

DOCUMENT GENERATION SYSTEM, METHOD OF CONTROLLING THE SAME, AND NON-TRANSITORY COMPUTER READABLE MEDIUM

BACKGROUND OF THE INVENTION

Field of the Invention

The present invention relates to a document generation system, a method of controlling the same, and a non-transitory computer readable medium.

Description of the Related Art

Recently, an increasing number of companies are replacing information on paper media with document data for the purpose of optimizing the business and saving resources by going paperless. In-house business forms, for example, are also subject to this, and in particular, because often a large number of pages are outputted for forms outputted by a core system, operation costs become large, and electronic conversion of forms is actively being carried out.

In addition, the use of cloud services has begun to become widespread as a form of managing business data and performing various types of processing. The user accesses a Web page of the cloud service from a Web browser of a client terminal via the Internet, and browses form document data digitized on the Web page. Further, it is anticipated that there will be an increase in use cases such as when form document data being browsed is edited and printed in accordance with a business flow. When form document data is handled on Web pages, it is assumed that a format such as SVG (Scalable Vector Graphics) having a higher compatibility with the Web is used instead of PDF (Portable Document Format) format data commonly used in a form system. By using SVG, image quality deterioration does not occur due to enlargement or reduction of a screen, and rendering using dynamic expressions which is difficult to realize with conventional form document data becomes possible, and Web forms with high additional value can be realized.

When the entire form document is generated and then displayed on the Web browser, there is a possibility that the user will have to wait before he/she can browse on the Web page after the form is generated, particularly in a case of a business form having a large number of pages. Therefore, instead of waiting for the entire document to be generated and transmitted, PDFs are generated by dividing the form document into units of predetermined pages, and each PDF is converted into an SVG or the like. Then, pages are swiftly received in order from the converted pages and displayed on the Web browser. In such a form document generation system, it is assumed that it is desired to store a Web form displayed on a Web browser of a client terminal as an electronic document. However, while SVG is not suitable for use in storage because it can be easily rewritten, PDF is suitable for use in storage. For this reason, generating a form document in the PDF format once again for storage can be considered. Japanese Patent Laid-Open No. 2002-63000 discloses a method of generating one piece of document data by combining a plurality of print data documents.

However, there are the following problems in regenerating a form document in PDF format for storage. The user needs to access the original Web page again, reselect the same data as in the form that he/she has browsed, and perform a form creation operation by designating storage usage instead of Web form browsing usage, the user operation of which takes effort. Further, in the case of Japanese Patent Laid-Open No. 2002-63000, since one or more piece of document data are arranged in an arbitrary order and combined into one print data document by an operation of the user, an instruction operation by the user is necessary and labor is required.

SUMMARY OF THE INVENTION

The present invention makes it possible to reduce the burden of a user operation when a form displayed on a Web browser is stored as an electronic document.

According to one aspect of the present invention, there is provided a document generation system comprising: a generation unit configured to generate a plurality of form data of a first file format from document data; a conversion unit configured to convert the plurality of form data of the first file format into a plurality of form data of a second file format; a display control unit configured to cause a display unit to display the plurality of form data of the second file format converted by the conversion unit so as to be able to accept a storage request; and a storage control unit configured to, in response to accepting a storage request for the plurality of form data of the second file format displayed on the display unit, combine the plurality of form data of the first file format corresponding to the plurality of form data of the second file format into data of the first file format and store the combined data in a storage unit.

According to another aspect of the present invention, there is provided a method of controlling a document generation system comprising: generating a plurality of form data of a first file format from document data; converting the plurality of form data of the first file format into a plurality of form data of a second file format; displaying to a display unit the plurality of form data of the second file format converted by converting so as to be able to accept a storage request; and in response to accepting a storage request for the plurality of form data of the second file format displayed on the display unit, combining the plurality of form data of the first file format corresponding to the plurality of form data of the second file format into data of the first file format and storing the combined data in a storage unit.

According to another aspect of the present invention, there is provided a non-transitory computer-readable storage medium storing a program for causing one or more computer to function as a document generation system, comprising: a generation unit configured to generate a plurality of form data of a first file format from document data; a conversion unit configured to convert the plurality of form data of the first file format into a plurality of form data of a second file format; a display control unit configured to cause a display unit to display the plurality of form data of the second file format converted by the conversion unit so as to be able to accept a storage request; and a storage control unit configured to, in response to accepting a storage request for the plurality of form data of the second file format displayed on the display unit, combine the plurality of form data of the first file format corresponding to the plurality of form data of the second file format into data of the first file format and store the combined data in a storage unit.

By virtue of the present invention, it possible to reduce a burden of a user operation when a form displayed on a Web browser is stored as an electronic document.

Further features of the present invention will become apparent from the following description of exemplary embodiments (with reference to the attached drawings).

BRIEF DESCRIPTION OF THE DRAWINGS

FIG. 1 is a view illustrating an example of a system configuration according to embodiments.

FIG. 2 is a view illustrating an example of a hardware configuration of a device according to embodiments.

FIG. 6 is a view illustrating an example of an index file according to embodiments.

FIG. 9 is a view illustrating an example of a business screen according to embodiments.

FIG. 10 is a view illustrating an example of a Web form screen according to embodiments.

DESCRIPTION OF THE EMBODIMENTS

Figure 3:
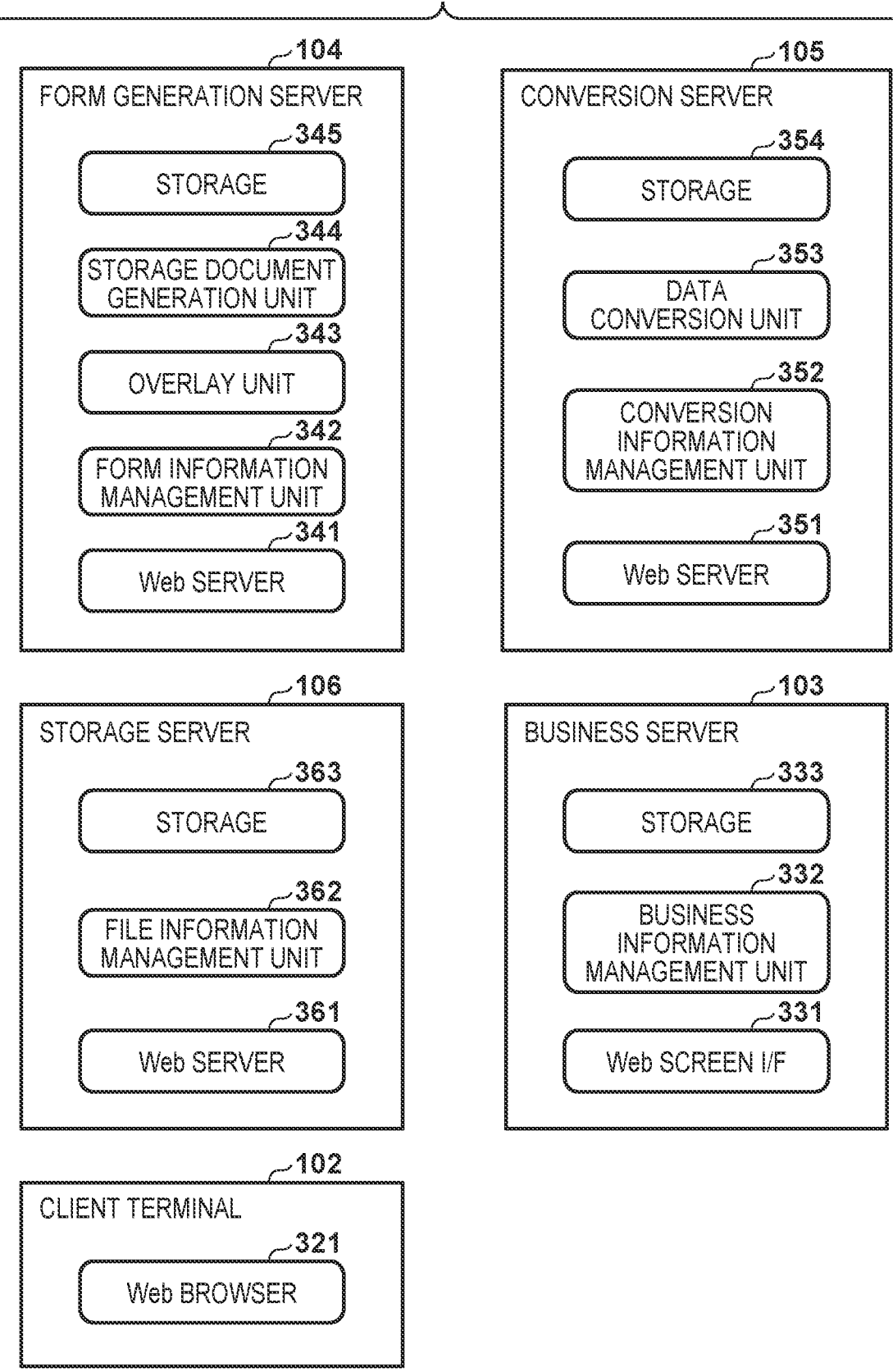
FIG. 3 is a view illustrating an example of a software configuration of a device according to embodiments.

Hereinafter, embodiments for carrying out the present invention will be described with reference to the drawings. Note that embodiments below are merely examples, and are not intended to be limiting.
<First Embodiment>
[System Configuration]

FIG. 1 is a view illustrating an example of a system configuration according to the embodiment of present invention. In FIG. 1, a client terminal 102 is connected to a local network 101 via a wired or wireless LAN, and accesses the Internet 100 via a local network 101. Various servers are provided on the Internet 100 or the local network 101, and the client terminal 102 can access these servers. The client terminal 102 corresponds to, for example, a desktop personal computer, a notebook computer, a smart phone, a tablet PC, or the like. The client terminal 102 has a built-in environment for executing a program such as a Web browser. Although only one client terminal 102 is shown here, a plurality of client terminals may exist on the network.

A business server 103 is a server that manages user business information. In this embodiment, it is assumed that the business information is managed by the business server 103, and a salesperson uses the information of the business server 103 to perform sales to a customer. The business server 103 provides a screen for displaying business information and instructing generation of form data in response to a request from the client terminal 102.

A form generation server 104 receives the business information from the business server 103, and executes overlay output processing and form browsing program generation processing. That is, the form generation server 104 generates a print page by overlaying a field data file, which is text data, and a form information file including predetermined form information. Then, the form generation server 104 instructs a virtual printer (not shown) to generate the aforementioned generated print page as a PDF file. Further, the form generation server 104 generates a form browsing program capable of browsing the generated form document.

In the present embodiment, the form browsing program is a Web application that can be distributed via a network and operates on a Web browser. Often, these web applications are applications that operate in a mashup language (e.g., HTML (Hypertext Markup Language)) that represents a Web page and a programming language (e.g., JavaScript®) that operates on Web browsers. The form browsing program may be an application that executes and operates on a computer system in addition to a Web application that operates on a Web browser. In the present embodiment, a mode in which the client terminal 102 includes/uses a Web browser which functions as a display unit for displaying each piece of data is described.

The form generation server 104 overlays business information on a form information file to generate and manage a form document. In addition, the form generation server 104 issues a conversion request to a conversion server 105 to convert the generated form document into a Web form document. The form generation server 104 accepts a form document storage request from the client terminal 102, and stores the form document into a storage server 106.

In the present embodiment, a PDF file and an SVG file are given as an example of file formats to be handled. However, the present invention is not limited to these file formats, and other file formats may be used as long as the file format has characteristics to which the present invention can be applied.

The conversion server 105 accepts a request to convert a form document from the form generation server 104, and generates a Web form document. The Web form document is a form document in the form of SVG or the like handled on a Web page.

The storage server 106 is a server that performs file management, and accepts file upload/download from the client terminal 102, the form generation server 104, or the conversion server 105. The storage server 106 has a function of managing a life cycle of a file, and the storage server 106 automatically deletes a file when a predetermined time has elapsed since its storage. In the present embodiment, it is assumed that a file stored in a predetermined file path is automatically deleted when one or more days have elapsed since the storage. Hereinafter, a "life cycle management region" which is a region that is automatically deleted by a life cycle management function is described. In addition to such a region, the storage server 106 may include a storage region for deleting a file based on a deletion instruction from a user or the like without automatically deleting the file.

Note, in the present embodiment, it is assumed that a user administrator stores the following information in each server in advance. That is, the business information data is stored in the business server 103, and the form information file corresponding to the customer data is stored in the form generation server 104.

Although each server is shown individually in FIG. 1, the present invention is not limited to this configuration, and for example, one device may have a function of a plurality of servers or a function of one server may be realized by a plurality of devices. For example, various servers may be collectively handled as a document generation system.

[Hardware Configuration]

FIG. 2 is a view illustrating an example of a hardware configuration of an information processing apparatus operable as the client terminal 102, the business server 103, the form generation server 104, the conversion server 105, and the storage server 106 according to the present embodiment. Here, each device is described as having the same configuration, but each device may have different parts.

An information processing apparatus 200 shown in FIG. 2 is configured to include a CPU 201, a ROM 202, a RAM 203, an HDD 204, an input device 205, an output device 206, and an I/F (interface) 207, and the respective parts are communicably connected via an internal bus 208. The CPU 201 directly or indirectly controls each part connected to the internal bus 208, and executes programs for realizing the present invention. The ROM 202 is a non-volatile storage unit, and stores, for example, a BIOS (Basic Input/Output System) or the like. The RAM 203 is a volatile storage unit, and is used as a work region of the CPU 201, or is used as a temporary storage for loading a software module for realizing the present invention. The HDD 204 is a non-volatile storage device, and stores an OS (Operating System), software modules, and the like, which are basic software. The input device 205 is used, for example, when a user input is accepted by an operation of a user, and corresponds to a keyboard, a pointing device, or the like (not shown). The output device 206 is used when outputting a processing result in the information processing apparatus 200, and corresponds to a display or the like. The I/F 207 is an interface for connecting to networks, and is used when communicating with external devices.

After the information processing apparatus 200 is started up, the BIOS is executed by the CPU 201, and the OS is loaded from the HDD 204 to the RAM 203 so that the OS can be executed. The CPU 201 loads various software modules, which are described later, from the HDD 204 to the RAM 203 in accordance with the operation of the OS, so that the software modules can be executed at any time. The various software modules are executed and operated by the CPU 201 in cooperation with the above devices. The I/F 207 is connected to the Internet 100 and the local network 101, and is controlled by the CPU 201 in accordance with the operation of the OS, thereby realizing communication by the above-described communication unit.

[Software Configuration]

FIG. 3 is a view illustrating an example of a software configuration of the client terminal 102, the business server 103, the form generation server 104, the conversion server 105, and the storage server 106 according to the present embodiment. Each software configuration and the management information handled by each device is described. Here, only configurations relating to the operation and processing of the present invention are described, and description of other configurations is omitted.

(Business Server)

The business server 103 includes a Web screen I/F 331, a business information management unit 332, and a storage 333. The respective software modules are stored in the HDD 204 provided in the business server 103, and are loaded into the RAM 203 and executed by the CPU 201.

The Web screen I/F 331 provides a user interface of the business server 103, and generates and returns a screen for displaying business information in response to requests from a Web browser 321 of the client terminal 102. The business information management unit 332 stores and manages the business information in the storage 333. These pieces of information may be stored not in the external memory of the business server 103, but in another server configured to be able to communicate via the Internet 100 or the local network 101.

An example of the customer information managed by the business information management unit 332 is shown in Table 1.

TABLE 1

| CUSTOMER ID | NAME | ADDRESS | BIRTH DATE | CONTACT |
|---|---|---|---|---|
| 1 | FORM TARO | A PREFECTURE B CITY 1-2-3 | 1989 Jan. 01 | 090-9999-9999 |
| 2 | FORM HANAKO | C PREFECTURE D CITY 2-3-4 | 1990 Feb. 02 | 080-1111-1111 |

The customer information is a data table used when a form is generated. In the present embodiment, the customer information includes a customer ID, a name, an address, a birth date, and a contact for uniquely identifying the customer. The data necessary for generating the form is not limited to the customer information of the present embodiment, and various items such as inventory of products, delivery information, deposit/withdrawal information, and the like are assumed. The customer information items shown here are examples, and other information may be included.

An example of the form information managed by the business information management unit 332 is shown in Table 2.

TABLE 2

| CUSTOMER ID | FORM NAME | FORM TEMPLATE ID |
|---|---|---|
| form-0001 | PLAN DESIGN SPECIFICATION A | template-001 |
| form-0002 | PLAN DESIGN SPECIFICATION B | template-002 |
| form-0003 | QUOTATION | template-003 |

The form information is a data table that holds form template information used when a form is generated. The form information includes a form ID for uniquely identifying the form information, a form name for screen display, and a form template ID for specifying a form information file managed by the form generation server 104. The form information items shown here are examples, and other information may be included.

The Web screen I/F 331 of the business server 103 accepts a form preview instruction from the Web browser 321 of the client terminal 102. The business information management unit 332 transmits the corresponding customer information and the form template ID of the form information to the form generation server 104, and makes a form generation request.

(Form Generation Server)

The form generation server 104 includes a Web server 341, a form information management unit 342, an overlay unit 343, a storage document generation unit 344, and a storage 345. The respective software modules are stored in the HDD 204 provided in the form generation server 104 and are loaded into the RAM 203 and executed by the CPU 201.

The Web server 341 provides various interfaces of the form generation server 104, accepts a request from the Web browser 321 of the client terminal 102 or the business server 103, and returns a response. The form information management unit 342 stores and manages the form template information and the form data information in the storage 345. The storage document generation unit 344 generates a form document in a format suitable for storage.

An example of the form template information managed by the form information management unit 342 is shown in Table 3.

TABLE 3

| FORM TEMPLATE ID | FORM TEMPLATE URL |
|---|---|
| template-001 | https://storage.com/templates/template-001 |
| template-002 | https://storage.com/templates/template-002 |
| template-003 | https://storage.com/templates/template-003 |

The form template information is a data table of a form information file managed by the form generation server 104. In the present embodiment, the form information file is held as a file in the storage server 106. The form template ID is an ID (identification information) for uniquely identifying the form information file, and corresponds to the form template ID of the form information managed by the business server 103.

Upon accepting a form generation request from the business server 103, the Web server 341 of the form generation server 104 instructs the overlay unit 343 to output an overlay based on the customer information included in the request and the form template ID. The overlay unit 343 accesses the form template URL of the corresponding form template information, obtains the form information file from the storage server 106, extracts the form information, overlays the form information with the corresponding customer information, and outputs the overlay to generate a PDF file. The form template URL is a URL (Uniform Resource Locator) indicating a position where the form template is stored.

The form information management unit 342 of the form generation server 104 manages the outputted PDF file together with an overlay index file in which the information of the PDF file is described in the life cycle management region of the storage server 106. The overlay index file is described later. Further, the form information management unit 342 of the form generation server 104 transmits the outputted PDF information to the conversion server 105, and makes a conversion request to the Web form document.

Table 4 shows an example of the form data information managed by the form information management unit 342 and held in the storage 345.

TABLE 4

| OVER-LAY ID | OVERLAY INDEX FILE URL | CON-VERSION ID | CONVERSION INDEX FILE URL |
|---|---|---|---|
| overlay-111 | https://storage.com/form/overlay-111/pdf/index.json | convert-123 | https://storage.com/form/overlay-111/svg/index.json |
| overlay-222 | https://storage.com/form/overlay-234/pdf/index.json | convert-234 | |
| overlay-333 | https://storage.com/form/overlay-345/pdf/index.json | | |

Form data information is a data table of a form document data managed by the form generation server 104. The overlay ID is an ID issued by the form information management unit 342 when a form generation request is accepted from the business server 103, and is an ID capable of uniquely identifying overlay processing. The overlay index file URL is a URL for accessing an index file in which information about a PDF file generated by the overlay unit 343 is described. When the overlay processing is started, the overlay unit 343 generates an overlay index file. The overlay index file is described later. The conversion ID is an ID that the conversion server 105 issues and returns as a response when the form generation server 104 issues a conversion request to the conversion server 105, and is an ID that can uniquely identify the conversion process. A conversion index file URL is a URL for obtaining a conversion index file. The conversion index file is described later.

The form generation server 104 requests the conversion server 105 to obtain conversion information by designating a conversion ID. When the conversion index file URL is returned as a response, the conversion index file URL is held in the form data information.

When the Web server 341 accepts a request to store a form document from the client terminal 102, it accesses the overlay index file URL from the relevant form data information based on the overlay ID included in the request. Then, the storage document generation unit 344 obtains the PDF file described in the obtained overlay index file and generates a form document for storage.

(Conversion Server)

The conversion server 105 includes a Web server 351, a conversion information management unit 352, a data conversion unit 353, and a storage 354. The respective software modules are stored in the HDD 204 provided in the conversion server 105, and are loaded into the RAM 203 and executed by the CPU 201.

The Web server 351 provides various interfaces of the conversion server 105, accepts a conversion request of a form document and a conversion information obtainment request from the form generation server 104, and returns a response. The conversion information management unit 352 stores and manages the conversion data information in the storage 354.

Table 5 shows an example of the conversion information managed by the conversion information management unit 352 and held in the storage 354.

TABLE 5

| CONVER-SION ID | OVERLAY INDEX FILE URL | CONVERSION INDEX FILE URL |
|---|---|---|
| convert-123 | https://storage.com/form/overlay-111/pdf/index.json | https://storage.com/form/overlay-111/svg/index.json |

TABLE 5-continued

| CONVER-
SION ID | OVERLAY INDEX
FILE URL | CONVERSION
INDEX FILE URL |
| --- | --- | --- |
| convert-234 | https://storage.com/
form/overlay-234/
pdf/index.json | https://storage.com/
form/overlay-234/
svg/index.json |
| convert-345 | https://storage.com/
form/overlay-345/
pdf/index.json | |

The conversion information is a data table for the conversion process managed by the conversion information management unit 352. The conversion ID is an ID issued by the conversion information management unit 352 when the conversion request is accepted from the form generation server 104, and is an ID capable of uniquely identifying the conversion processing. The overlay index file URL is a URL for accessing an index file in which information about a file to be converted is described, and is received when a conversion request is accepted from the form generation server 104. The overlay index file is described later. A conversion index file URL is a URL for accessing a conversion index file. When the conversion process is started, the data conversion unit 353 generates a conversion index file. The conversion index file is described later.

The data conversion unit 353 periodically obtains an overlay index file. Then, the data conversion unit 353 obtains the data to be converted described in the overlay index file, performs conversion, and describes the result in the conversion index file. When the conversion server 105 accepts a conversion information obtainment request designating a conversion ID from the form generation server 104, the conversion information management unit 352 extracts and returns the corresponding conversion information.
(Storage server)

The storage server 106 includes a Web server 361, a file information management unit 362, and a storage 363. The respective software modules are stored in the HDD 204 provided in the storage server 106 and are loaded into the RAM 203 and executed by the CPU 201.

The Web server 361 provides various interfaces of the storage server 106. The file information management unit 362 manages file information, and inputs and outputs a file in response to a request accepted by the Web server 361. The storage 363 stores file information and files received by the storage server 106.

An example of the file information managed by the file information management unit 362 is shown in Table 6.

TABLE 6

| DATA URL | FILE PATH |
| --- | --- |
| https://storage.com/form/overlay-111/pdf/index.json | /form/overlay-111/pdf/index.json |
| https://storage.com/form/overlay-234/pdf/index.json | /form/overlay-234/pdf/index.json |
| https://storage.com/form/overlay-345/pdf/index.json | /form/overlay-345/pdf/index.json |
| https://storage.com/form/overlay-111/svg/index.json | /form/overlay-111/svg/index.json |
| https://storage.com/form/overlay-234/svg/index.json | /form/overlay-234/svg/index.json |

The file information is information of a file to be stored in the storage server 106 managed by the file information management unit 362. The data URL is a URL for uniquely identifying a file to be stored in the storage server 106. The file path is a file path on the storage, and indicates a storage location of the file. The request for the data URL is accepted by the Web server 361, the file information management unit 362 updates the corresponding file information, and the file operation of the storage 363 is performed. For example, clients requesting file operations from the storage server 106 can download corresponding files by requesting an HTTP GET method to the data URL. The clients can upload and store files by making a request to the data URL, attaching files in an HTTP PUT method. In addition, clients can delete corresponding files by requesting an HTTP DELETE method with respect to the data URL.
[Index File]

Next, an index file which is generated at the time of execution of an overlay by the form generation server 104 and at the time of execution of a conversion by the conversion server 105 and which is sequentially updated is described.

In FIG. 6, states 600 to 630 represent, in chronological order, examples (states) of index files which are generated and updated when the form generation server 104 and the conversion server 105 execute the overlay output processing and the data conversion processing, respectively. The form generation server 104 and the conversion server 105 first generate an index file in the life cycle management region of the storage server 106 when the processing is started (state 600). In the present embodiment, the index file adopts a JSON file format, and includes a list of data URLs of processing results using "dataList" as a key, and a processing completion flag using "end" as a key. It is assumed that the index files used by the form generation server 104 and the conversion server 105 have the same configuration. In the following description, an index file generated and updated by the form generation server 104 at the time of overlay execution is referred to as an "overlay index file". An index file generated and updated by the conversion server 105 when the conversion is executed is referred to as a "conversion index file". In the following descriptions and drawings, the overlay index files are also denoted as "pdf-index", and the conversion index files are also denoted as "svg-index".

In the present embodiment, the overlay output result is a PDF file, and the unit of files outputted is one page each. For example, three PDF files are output for three pages of forms. However, the unit of files outputted does not need to be set for each page, and is not limited to a fixed number of pages, a value calculated from the total number of pages, or the like as long as it can be controlled by the overlay unit 343 of the form generation server 104. The conversion processing by the conversion server 105 also converts the overlay output result into units of PDF files.

The form generation server 104 and the conversion server 105 generate an index file (state 600) in an initial state at the start of processing. At this time, since the file is not generated, the element of "dataList" is empty, and the value of "end" indicating the process result is "false". Thereafter, the form generation server 104 and the conversion server 105 respectively execute processing sequentially, upload the files of the processing results to the life cycle management region of the storage server 106, and add the data URLs to "dataList". State 610 indicates the state of the index file where a first file has been uploaded. State 620 indicates the state of the index file where a second file has been uploaded. Further, the form generation server 104 and the conversion server 105 respectively update the index file to the state 630 at the time of upload of the file which is the processing result for the third file, which is the last page. In the state 630, the data URL corresponding to the third file is added to "dataList", and the processing completion flag "end" is updated to "true".

The conversion server 105 obtains the overlay index file from the storage server 106 and refers to the overlay index file, thereby grasping the progress of the overlay output of the form generation server 104 and starting the conversion processing from the PDF file for which the overlay output has been completed. In addition, the client terminal 102 can grasp the progress of the conversion process of the conversion server 105 by obtaining and referring to the conversion index file from the storage server 106, and can download and display the Web form document whose conversion has been completed.

[Overlay Processing]

Figure 4:
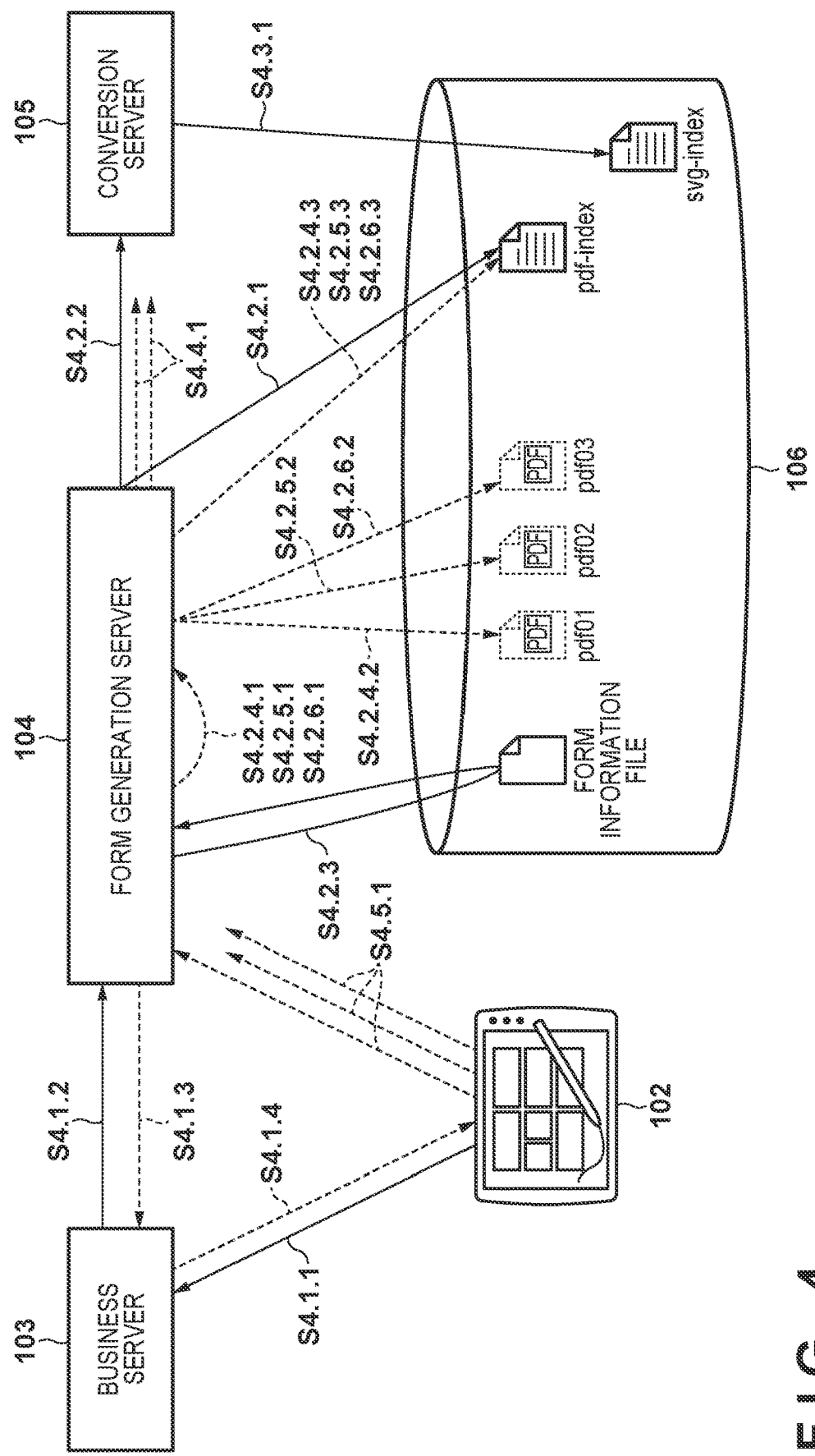
FIG. 4 is a flowchart of overlay processing according to embodiments.

FIG. 4 is a flowchart of a process from when the Web browser 321 of the client terminal 102 according to the present embodiment issues a form preview request to the business server 103 and up to when the form generation server 104 starts overlay output processing and sends a conversion request to the conversion server 105. This flow is started when the user executes a form preview request operation on the screen displayed on the Web browser 321 of the client terminal 102.

The client terminal 102 accepts the pressing of a form preview button 930 of a business screen 900 displayed on the Web browser 321 by the user. Accordingly, in step S4.1.1, the Web browser 321 transmits a form preview request including the customer ID and the form ID of the form information selected in form information 920 to the business server 103.

FIG. 9 is an example of the business screen 900 when business data is displayed by accessing the business server 103 from the Web browser 321 of the client terminal 102. Customer information 910 and the form information 920 held by the business server 103 are displayed on the business screen 900. The form information 920 is a form selection drop-down list by which it is possible to select one of the pieces of form information registered as form information. The form information (document data) designated by the form information 920 is treated as a preview target. A preview button 930 is a button for performing a form preview request operation.

In step S4.1.2, the business information management unit 332 of the business server 103 designates the customer ID included in the form preview request received in step S4.1.1, the customer information corresponding to the form ID, and the form template ID, and transmits the form generation request to the form generation server 104.

In step S4.1.3, when the form generation server 104 receives the form generation request, the form information management unit 342 issues the overlay ID and registers it in the form data information. Further, the form generation server 104 returns an overlay ID to the business server 103 as a response to the request.

In step S4.1.4, the business server 103 returns the overlay ID obtained from the form generation server 104 to the Web browser 321 of the client terminal 102.

In addition, the form information management unit 342 of the form generation server 104, in parallel with step S4.1.3, obtains the form template URL from the form template information based on the form template ID included in the request. Then, the form information management unit 342 issues an overlay output instruction to the overlay unit 343 together with the customer information.

In step S4.2.1, when the overlay unit 343 of the form generation server 104 receives the overlay output instruction, the overlay unit 343 generates an overlay index file (state 600) and uploads it to the life cycle management region of the storage server 106.

In step S4.2.2, the overlay unit 343 sends a conversion request including the data URL of the overlay index file (state 600) uploaded in step S4.2.1 to the conversion server 105.

In step S4.2.3, the overlay unit 343 accesses the form template URL on the storage server 106 to obtain a form information file and start overlay processing by overlaying it with customer information.

In step S4.2.4.1, the overlay unit 343 outputs a PDF file (PDF01) as the overlay output result.

In step S4.2.4.2, the overlay unit 343 uploads the PDF file (PDF01) generated in step S4.2.4.1 to the life cycle management region of the storage server 106.

In step S4.2.4.3, the overlay unit 343 adds the data URL of the PDF file (PDF01) uploaded in step S4.2.4.2 to the "dataList" of the overlay index file (state 610). The overlay unit 343 then uploads the overlay index file to the same data URL as step S4.2.1.

Similarly, the overlay unit 343 performs the following overlay processing (step S4.2.5.1), then uploads the output results PDF (PDF02) to the life cycle management region of the storage server 106 (step S4.2.5.2). Further, the overlay unit 343 adds the data URL of the uploaded PDF file (PDF02) to the data URL "dataList" of the overlay index file (state 620). The overlay unit 343 then uploads the overlay index file to the same data URL as step S4.2.1 (step S4.2.5.3).

Step S4.2.6.1 through step S4.2.6.3 are overlay processing for the final page. In step S4.2.6.1, the overlay unit 343 outputs the PDF file (PDF03) as the overlay output result.

In step S4.2.6.2, the overlay unit 343 uploads the PDF file (PDF03) generated in step S4.2.6.1 to the life cycle management region of the storage server 106.

In step S4.2.6.3, the overlay unit 343 adds the data URL of the PDF file (PDF03) uploaded in step S4.2.6.2 to "dataList." Further, the overlay unit 343 updates the processing completion flag "end" to "true", which is a value indicating completion. Then, the overlay unit 343 uploads the overlay index file (state 610) to the life cycle management region of the storage server 106. Note, if there are many overlay output units, the process of step S4.2.5.1 to step S4.2.5.3 is repeated.

Meanwhile, when the conversion server 105 accepts the conversion request in step S4.2.2, in step S4.3.1, the conversion information management unit 352 issues a conversion ID, and returns it to the form generation server 104 as a response to the conversion request. In addition, the conversion server 105 registers the conversion ID together with the received overlay index file URL as conversion information. In addition, the conversion information management unit 352 passes the overlay index file URL to the data conversion unit 353, and issues a conversion instruction. Upon receiving the conversion instruction, the data conversion unit 353 generates a conversion index file (state 600) in the initial state and uploads the file to the life cycle management region of the storage server 106. Further, the data conversion unit 353 registers the data URL in the corresponding conversion information.

In step S4.4.1, the form generation server 104 uses the conversion ID returned in response to the conversion request in step S4.2.2 as a key to obtain conversion information periodically to the conversion server 105. The periodic obtainment interval is not particularly limited, but may be defined in advance. If there is a value in the conversion index file URL for the conversion information obtained in the response in step S4.4.1, the form generation server 104 updates the corresponding conversion index file URL of the form data information and completes the process in step S4.4.1.

Meanwhile, the Web browser 321 of the client terminal 102 receives the overlay ID in step S4.1.4, then designates the overlay ID and periodically obtains the form data information from the form generation server 104 (step S4.5.1). The periodic obtainment interval is not particularly limited, and may be defined in advance. If the response in step S4.5.1 contains a conversion index file URL, the Web browser 321 completes the process in step S4.5.1 and begins to obtain the conversion index file. At this time, the content of the conversion index file obtained by the Web browser 321 is one of the states 600 to 630 in FIG. 6 in accordance with the progress of the conversion processing performed in parallel by the conversion server 105.

[Data Conversion Processing]

Figure 5:
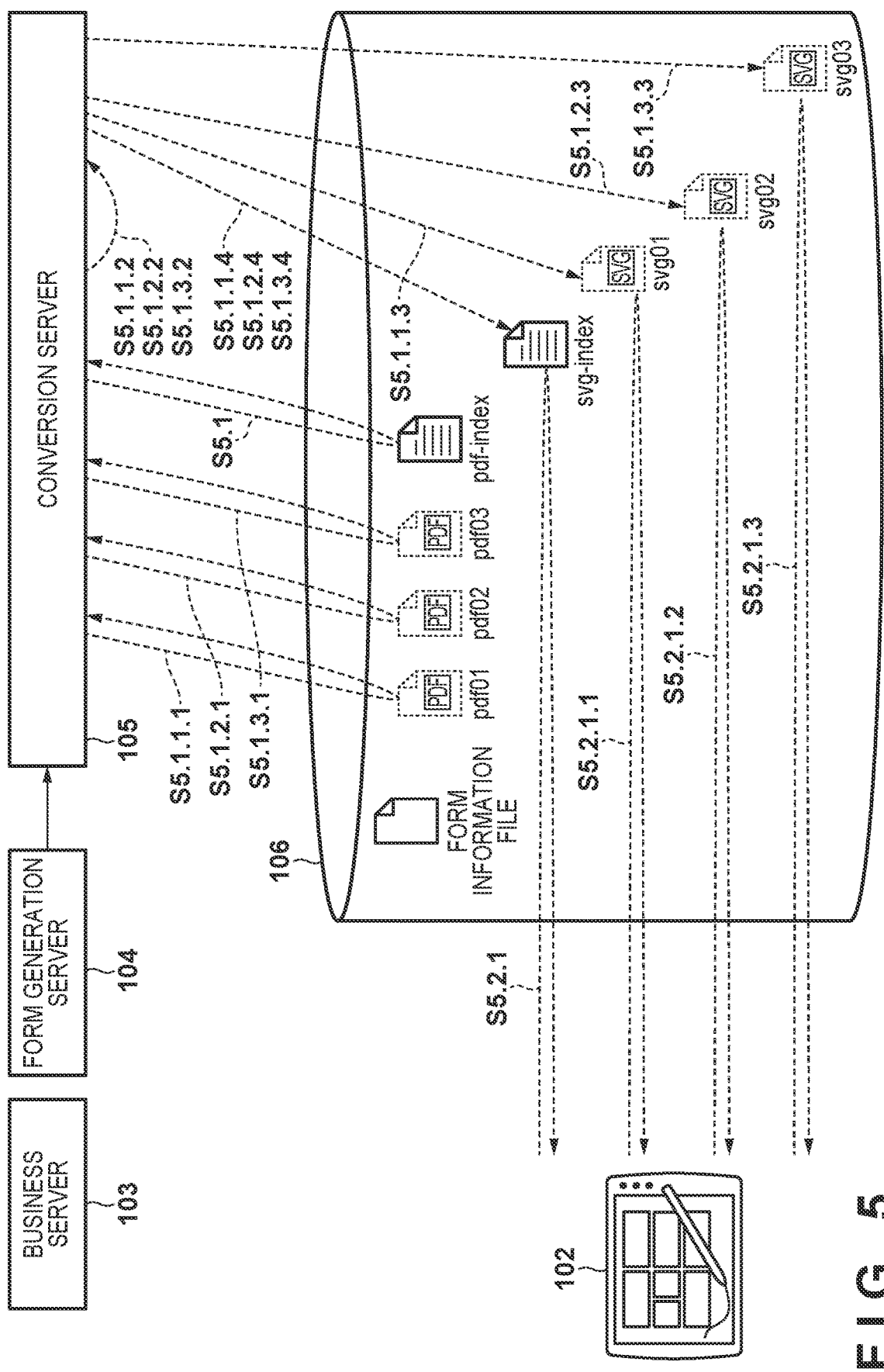
FIG. 5 is a flowchart of data conversion processing according to a first embodiment.

FIG. 5 is a flowchart for a data conversion by the conversion server 105 according to the present embodiment and from when the client terminal 102 obtains a Web form document up until when the client terminal 102 displays the Web form document. The data conversion by the conversion server 105 of this flow is started by receiving a conversion request from the form generation server 104 in step S4.2.2. A Web form document display flow of the client terminal 102 of this flow begins when the Web browser 321 of the client terminal 102 completes step S4.5.1 shown in FIG. 4 and starts obtaining the conversion index file.

When the conversion server 105 accepts the conversion request (step S4.2.2 shown in FIG. 4), the data conversion unit 353 starts the conversion process.

In step S5.1, the data conversion unit 353 accesses the overlay index file URL included in the conversion request and downloads the overlay index file from the storage server 106.

In step S5.1.1.1, the data conversion unit 353 refers to the overlay index file, and if there is an overlaid data URL in "dataList" (state 610), obtains the PDF file (PDF01) from the data URL.

In step S5.1.1.2, the data conversion unit 353 converts the PDF file (PDF01) into a Web form document (SVG01).

In step S5.1.1.3, the data conversion unit 353 uploads the Web form document (SVG01) generated in step S5.1.1.2 to the life cycle management region of the storage server 106.

In step S5.1.1.4, the data conversion unit 353 adds the data URL of the Web form document (SVG01) that has been uploaded to the "dataList" of the conversion index file (state 610), and uploads it to the same data URL as step S4.3.1 in FIG. 4. Thereafter, the data conversion unit 353 periodically accesses the overlay index file URL to confirm the overlay index file. Then, the data conversion unit 353 performs step S5.1.2.1 to step S5.1.2.4 and step S5.1.3.1 to step S5.1.3.4 in sequence. In step S5.1, if the processing completion flag "end" of the overlay index file is "true" (state 630), the data conversion unit 353 updates the processing completion flag "end" of the conversion index file to "true" in step S5.1.3.4. In step S5.1.3.4, the conversion process is completed for all the data URLs in "dataList". As a result, the conversion index file is also in the state 630.

On the other hand, after obtaining the conversion index file URL of the form data information in the response of step S4.5.1 in FIG. 4, the Web browser 321 periodically accesses the conversion index file URL in step S5.2.1 and downloads the conversion index file. The periodic obtainment interval is not particularly limited, but may be defined in advance.

If a URL exists in "dataList" of the conversion index file downloaded in step S5.2.1 (states 610 to 630), the Web browser 321 downloads the Web form document from that data URL. The Web browser 321 then displays the downloaded Web form documents on a Web form screen 1000 (step S5.2.1.1 to step S5.2.1.3). The Web browser 321 ends the processing of step S5.2.1 at the time when the processing completion flag "end" of the conversion index file is "true" (state 630).

FIG. 10 is an example of the Web form screen 1000 displayed on the Web browser 321. The Web form screen 1000 is an example of a screen that the Web browser 321 of the client terminal 102 obtained and displayed in step S5.2.1 and step S5.2.1.1 to step S5.2.1.3. A form screen 1020 is an example of a rendered Web form document obtained by the Web browser 321. Page information 1010 shows the number of pages of the obtained web form document and the number of pages currently being displayed, and changes according to the processing progress of step S5.2.1.1 to step S5.2.1.3. A store button 1030 is a button for requesting the form generation server 104 to store a form document.

The flows shown in FIGS. 4 and 5 are triggered by the state and content of the respective index files, and the overlay processing of the form generation server 104, the data conversion processing of the conversion server 105, and the displaying of the Web form document on the client terminal 102 can run in parallel.

After uploading the overlay index file to the storage server 106 (step S4.2.1), upon completion of processing the PDF01, the form generation server 104 adds the data URL in step S4.2.4.3 (updates to the state 610). Subsequently, the form generation server 104 starts processing of the PDF02. At this time, the conversion server 105, which periodically confirms the overlay index file in the process of step S5.1, detects that the PDF01 data URL has been added. Then, the conversion server 105 starts a process of converting the PDF01 into the SVG01 (step S5.1.1.1 to step S5.1.1.4). Also, when processing of the SVG01 is completed, the conversion server 105 adds the SVG01 data URL to the conversion index file in step S5.1.1.4 (updated to State 610), and performs processing of the PDF02 when it is detected that the PDF02 data URL was added in step S5.1.

Furthermore, the client terminal 102 periodically accesses the conversion index file URL obtained as a response to step S4.5.1 to confirm the conversion index file (step S5.2.1). In step S4.5.1, the conversion index file URL is returned only after the conversion server 105 generates the conversion index file in step S4.3.1 and the form generation server 104 received it as a reply in step S4.4.1. When the client terminal 102 detects that the SVG01 data URL has been added to the conversion index file, the client terminal 102 obtains the SVG01 in step S5.2.1.1, and displays this on the Web form screen 1000.

After processing the PDF01, the form generation server 104 continuously processes the PDF02 and the PDF03 and sequentially updates the overlay index file (states 620 and 630).

On the other hand, the conversion server 105 continues to confirm step S5.1, and when the update of the overlay index file is detected, the conversion process of SVG02 and SVG03 is carried out, and the conversion index file is updated.

Further, the client terminal 102 similarly continues the confirmation in step S5.2.1, and when the client terminal 102 detects the update of the conversion index file, the client terminal 102 obtains the data of the SVG02 and the data of the SVG03 according to the content, and displays the data on the Web form screen 1000.

[Form Storage Request Processing]

Figure 7:
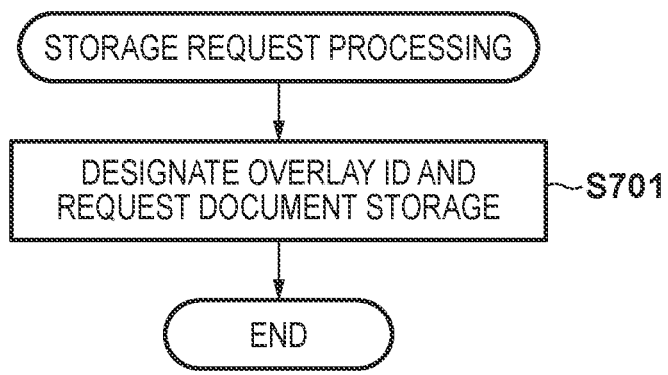
FIG. 7 is a flowchart of form storage request processing of the client terminal according to the first embodiment.

FIG. 7 is a flowchart illustrating the form storage request processing in the client terminal 102 according to the present embodiment. This flow is realized by the CPU 201 of the client terminal 102 reading a corresponding program from the HDD 204 or the like and executing the program. In the present embodiment, the user presses the store button 1030 provided on the Web form screen 1000 displayed on the Web browser 321 to start the operation.

In step S701, when the user presses the store button 1030, the Web browser 321 of the client terminal 102 issues a form storage request to the form generation server 104. In this case, the Web browser 321 includes the overlay ID received in step S4.1.4 of FIG. 4 in the form storage request and sends it. Then, the processing flow ends.

[Form Storage Processing]

Figure 8:
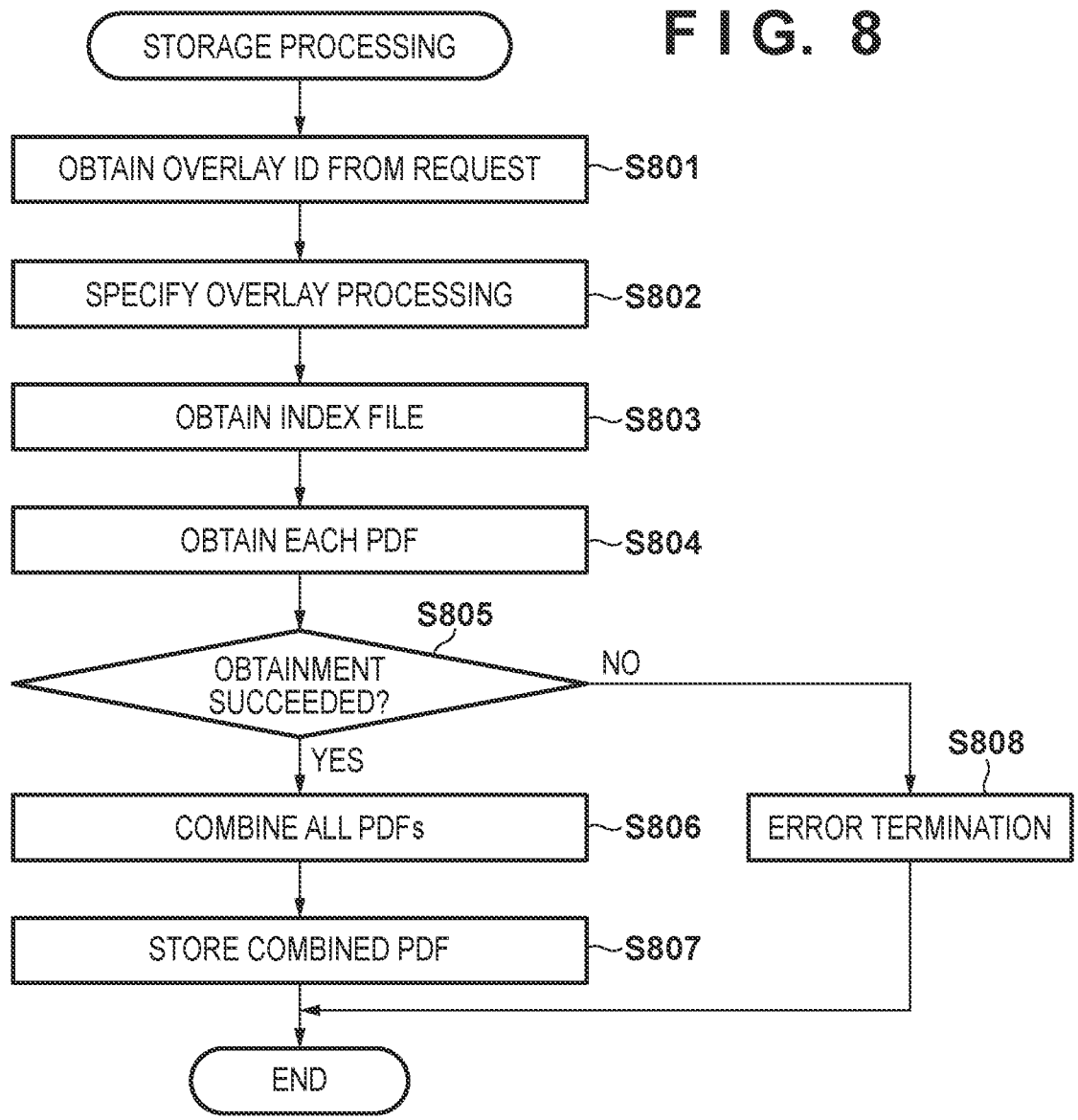
FIG. 8 is a flowchart of form storage processing of a form generation server according to the first embodiment.

FIG. 8 is a flowchart illustrating the form storage processing in the form generation server 104 according to the present embodiment. This flow is realized by the CPU 201 of the form generation server 104 reading a corresponding program from the HDD 204 or the like and executing the program. In the present embodiment, the form generation server 104 is started in response to receiving a form storage request transmitted from the client terminal 102.

In step S801, upon receiving the form storage request, the storage document generation unit 344 obtains the overlay IDs included in the request.

In step S802, the storage document generation unit 344 identifies the overlay processing from the obtained overlay IDs, and obtains the overlay index file URL from the form data information (Table 4).

In step S803, the storage document generation unit 344 accesses the obtained overlay index file URL and downloads the overlay index file.

In step S804, the storage document generation unit 344 refers to the downloaded overlay index file, accesses all the data URLs included in the "dataList", and obtains all the PDF files.

In step S805, the storage document generation unit 344 determines whether the PDF file has been successfully obtained. When it is determined that the obtainment was successful (YES in step S805), the processing proceeds to step S806, and when it is determined that the obtainment was unsuccessful (NO in step S805), the processing proceeds to step S808.

In step S806, the storage document generation unit 344 combines all the obtained PDF files in the order of pages to generate a PDF file for storage. In this embodiment, PDF files are generated in order from the first page (step S4.2.4.1, step S4.2.5.1, step S4.2.6.1), and the file names of each generated PDF file are assigned a sequential number such as PDF01 and PDF02. When the PDF files are combined, the files are combined in order from the first page based on the sequential number of the PDF file name. Note, the means for combining pages in order is not limited to this method, and may be, for example, a method in which page number information is described in an overlay index file. Since the process of combining PDF files is well known, a detailed description thereof is omitted here. Thereafter, the processing proceeds to step S807.

In step S807, the storage document generation unit 344 stores the generated PDF file for storage in the life cycle management region of the storage server 106. Then, the processing flow ends.

In step S808, the storage document generation unit 344 performs error processing on the assumption that an error has occurred in the form storage processing. Then, the processing flow ends. The content of the error processing here is not particularly limited, but may be, for example, processing for notifying the client terminal 102 that the storage has failed.

In the present embodiment, since the separately generated PDF files, the SVG files, and the PDF files for storage are uploaded to the life cycle management region of the storage server 106, these files are deleted after one day, for example. However, the life cycle of each file is not limited to this. For example, the storage server 106 may not automatically delete the PDF file for storage. In this case, for example, the user performs a deletion instruction operation on a storage document deletion screen (not shown), and the Web browser 321 of the client terminal 102 issues a storage document deletion request to the form generation server 104. As a result, the form generation server 104 deletes the PDF file for storage from the storage server 106.

As described above, according to the present embodiment, by pressing the store button displayed on the screen of the Web form document, a storage document can be generated in a file format suitable for storage. As a result, it is possible to reduce the burden of the user operation when a Web form document is stored.

Second Embodiment

In the first embodiment, a configuration in which all pages of a Web form are included in a storage document has been described. In the present embodiment, a method of designating a page to be stored when a user executes a storage request is described. Note that in the present embodiment, the unit of output PDF files of the overlay output result is a plurality of pages. The description is made on the assumption that three PDF files are output for a form of 7 pages, and the PDF to be generated first is configured by 1 page, and the second and third PDFs are configured by 3 pages. The present embodiment is described with reference to the drawings. Note that description of portions common to those of the first embodiment is omitted, and only the different portions are described below.

[Data Conversion Processing]

Figure 11:
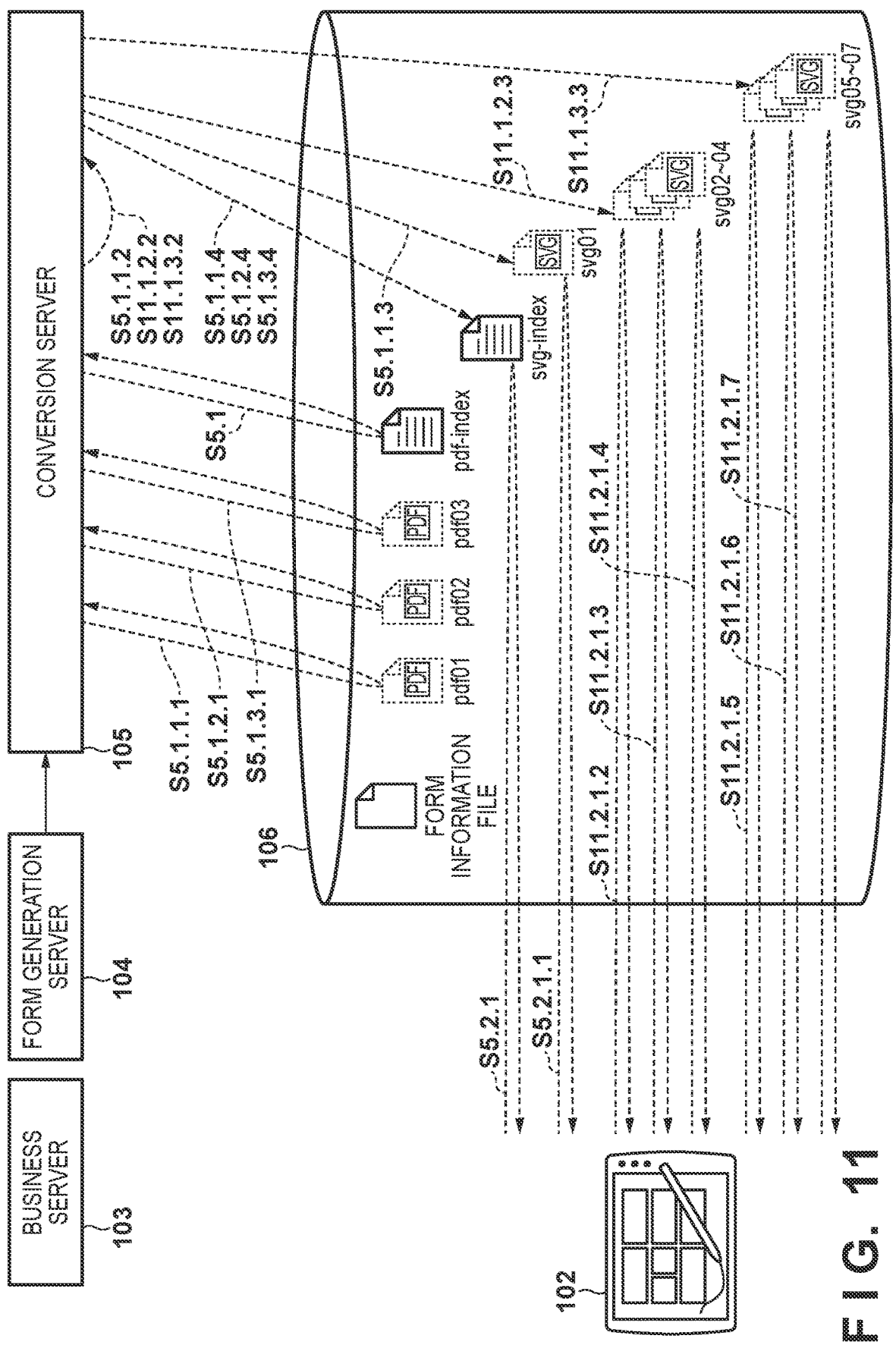
FIG. 11 is a flowchart of data conversion processing according to a second embodiment.

FIG. 11 is a flowchart of the data conversion of the conversion server 105 according to the present embodiment and processing until the client terminal 102 obtains and displays a Web form document. The data conversion of the conversion server 105 of this flow is started by receiving a conversion request from the form generation server 104 in step S4.2.2 of FIG. 4. The Web form document display flow of the client terminal 102 shown in FIG. 11 begins when the Web browser 321 of the client terminal 102 completes step S4.5.1 shown in FIG. 4 and starts obtaining the conversion index file. Note, in the same flow as in FIG. 5 described in the first embodiment, the same reference numerals are assigned, and only the different portions are described below.

In step S11.1.2.2, the data conversion unit 353 of the conversion server 105 converts the PDF file (PDF02) into a web form document. At this time, as described above, the PDF02 is configured by three pages. Since the SVG is configured by one page per one file, when the PDF02 is converted into SVG, only three SVG files are generated (SVG02 to 04).

In step S11.1.2.3, the data conversion unit 353 uploads the Web form document (SVG02 to 04) generated in step S11.1.2.2 to the life cycle management region of the storage server 106. The data conversion unit 353 adds the data URL of the Web form document (SVG02 to 04) that has been uploaded to the "dataList" of the conversion index file (state 620), and uploads it to the same data URL as step S4.3.1 (step S5.1.2.4).

On the other hand, the Web browser 321 of the client terminal 102 downloads the Web form document by referring to the data URL existing in the "dataList" of the conversion index file. The Web browser 321 then displays the downloaded Web form documents on the Web form screen 1000 (step S5.2.1.1 and step S11.2.1.2 to step S11.2.1.7).

[Form Storage Request Processing]

Figure 12:
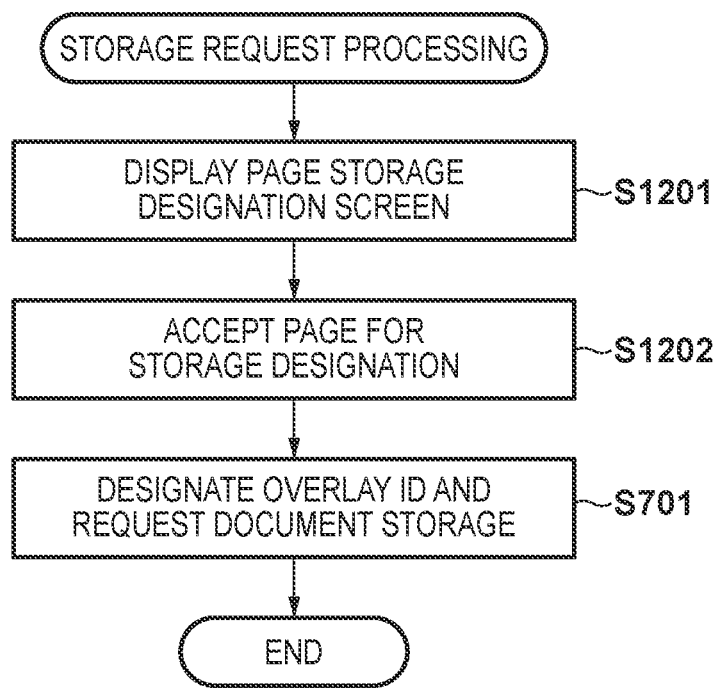
FIG. 12 is a flowchart of form storage request processing of the client terminal according to the second embodiment.

FIG. 12 is a flowchart illustrating the form storage request processing of the Web browser 321 of the client terminal 102 according to the present embodiment. This flow is realized by the CPU 201 of the client terminal 102 reading a corresponding program from the HDD 204 or the like and executing the program. In the present embodiment, the user presses the store button 1030 provided on the Web form screen 1000 displayed on the Web browser 321 to start the operation. Note, in the same processing as in FIG. 7 described in the first embodiment, the same reference numerals are assigned, and only the different portions are described below.

In step S1201, when the user presses the store button 1030, the Web browser 321 of the client terminal 102 displays a page storage designation screen 1401.

Figure 14:
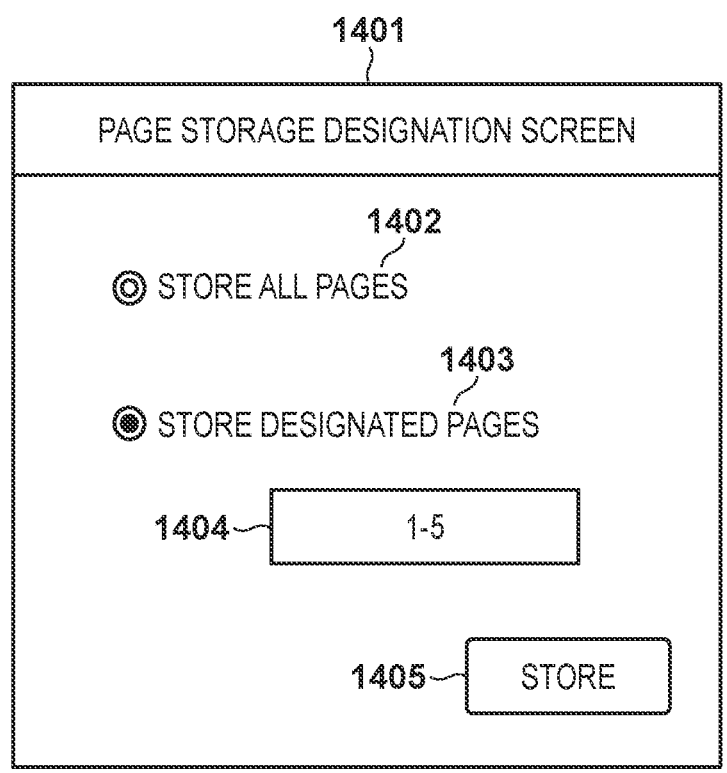
FIG. 14 is a view illustrating an example of a page storage designation screen according to the second embodiment.

FIG. 14 is an example of the page storage designation screen 1401. The page storage designation screen 1401 displays a radio button 1402 for designating storage of all pages, a radio button 1403 for designating storage of specific pages, and a text box 1404 for inputting a page number to be stored. A storage button 1405 is a button for instructing a request to the form generation server 104 for storage of a form document. In the example of FIG. 14, pages 1 to 5 are designated to be stored.

In step S1202, the Web browser 321 accepts the designation of a page for storage and the pressing of the storage button 1405 from the user via the page storage designation screen 1401.

In step S701, the Web browser 321 issues a form storage request to the form generation server 104. At this time, the Web browser 321 includes the overlay ID received in step S4.1.4 and the number of pages for storage designated in the page storage designation screen 1401 in the form storage request. When the radio button 1402 is selected, the Web browser 321 sets a value indicating "all pages" for the number of pages for storage and transmits a form storage request. When the radio button 1403 is selected and a page number is input in the text box 1404, the Web browser 321 sets the value input in the text box 1404 as the number of pages for storage and transmits a form storage request. Then, the processing flow ends.

[Form Storage Processing]

Figure 13:
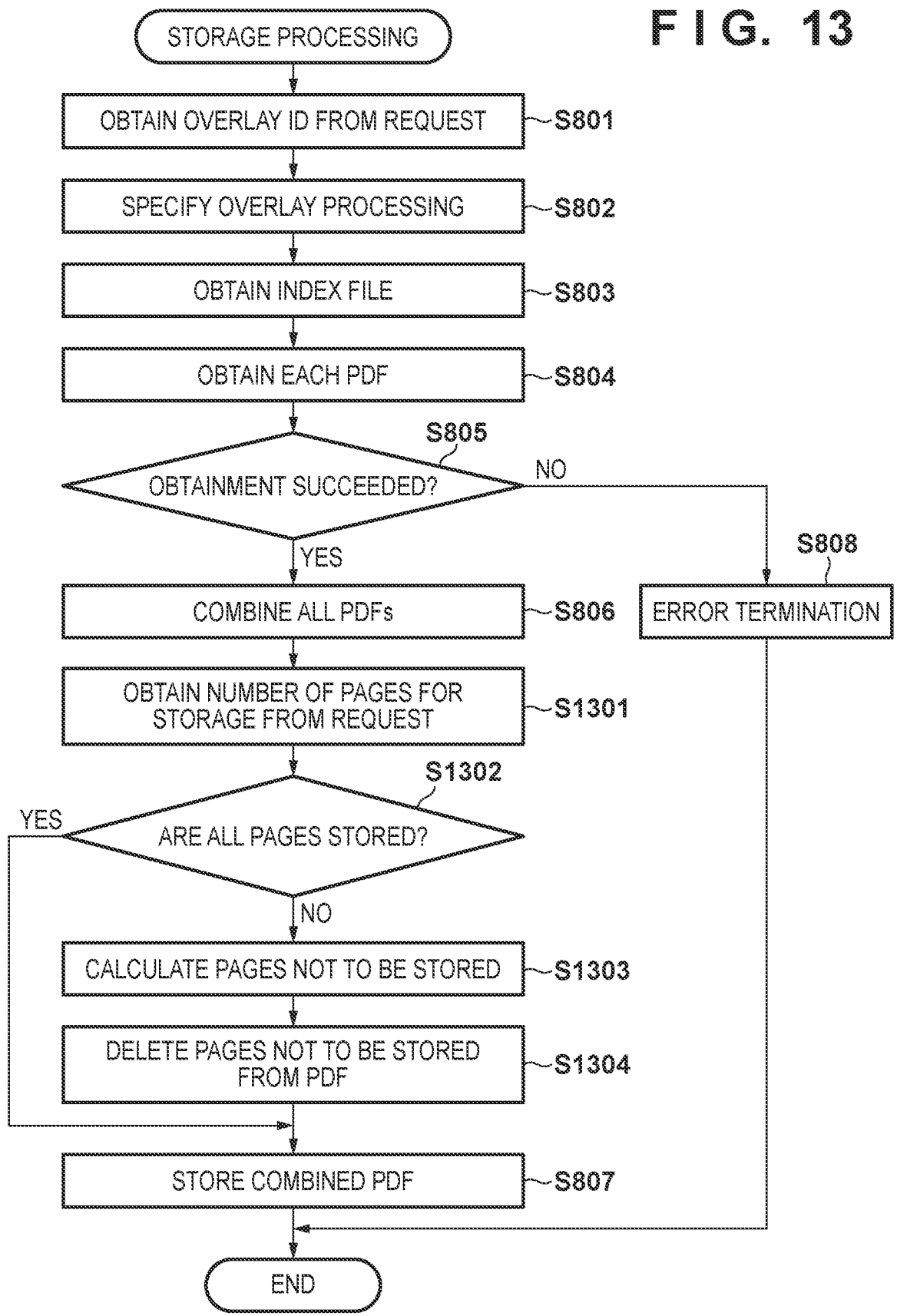
FIG. 13 is a flowchart of form storage processing of a form generation server according to the second embodiment.

FIG. 13 is a flowchart illustrating the form storage processing in the form generation server 104 according to the present embodiment. This flow is realized by the CPU 201 of the form generation server 104 reading a corresponding program from the HDD 204 or the like and executing the program. In the present embodiment, the form generation server 104 is started in response to receiving a form storage request transmitted from the client terminal 102. Note, in the same flow as in FIG. 8 described in the first embodiment, the same reference numerals are assigned, and only the different portions are described below.

In step S806, the storage document generation unit 344 of the form generation server 104 combines all the PDF files obtained in step S804 in the order of pages.

In step S1301, the storage document generation unit 344 obtains the number of pages for storage designated by the form storage request received from the client terminal 102.

In step S1302, the storage document generation unit 344 determines whether or not the number of pages for storage is a value indicating "all pages". When it is determined that the value does not mean "all pages" (NO in step S1302), the process proceeds to step S1303, and when it is determined that the value means "all pages" (NO in step S1302), the process proceeds to step S807.

In step S1303, the storage document generation unit 344 calculates pages not to be stored based on the number of pages for storage. In the present example, the PDF file combined in step S806 is configured by seven pages. Therefore, for example, when the storage button 1405 is pressed in the state displayed in the example of FIG. 14, the pages not to be stored are "6 to 7 pages".

In step S1304, the storage document generation unit 344 deletes the pages not to be stored from the PDF combined in step S806. Thereafter, the processing proceeds to step S807.

As described above, according to the present embodiment, in addition to the effect of the first embodiment, it is possible to designate a page to be stored by the user when the Web form document is stored.

Third Embodiment

The third embodiment according to the present invention is described with reference to the drawings. Note that description of portions common to those of the first and second embodiment is omitted, and only the different portions is described below.

[Form Display Request Processing]

Figure 15:
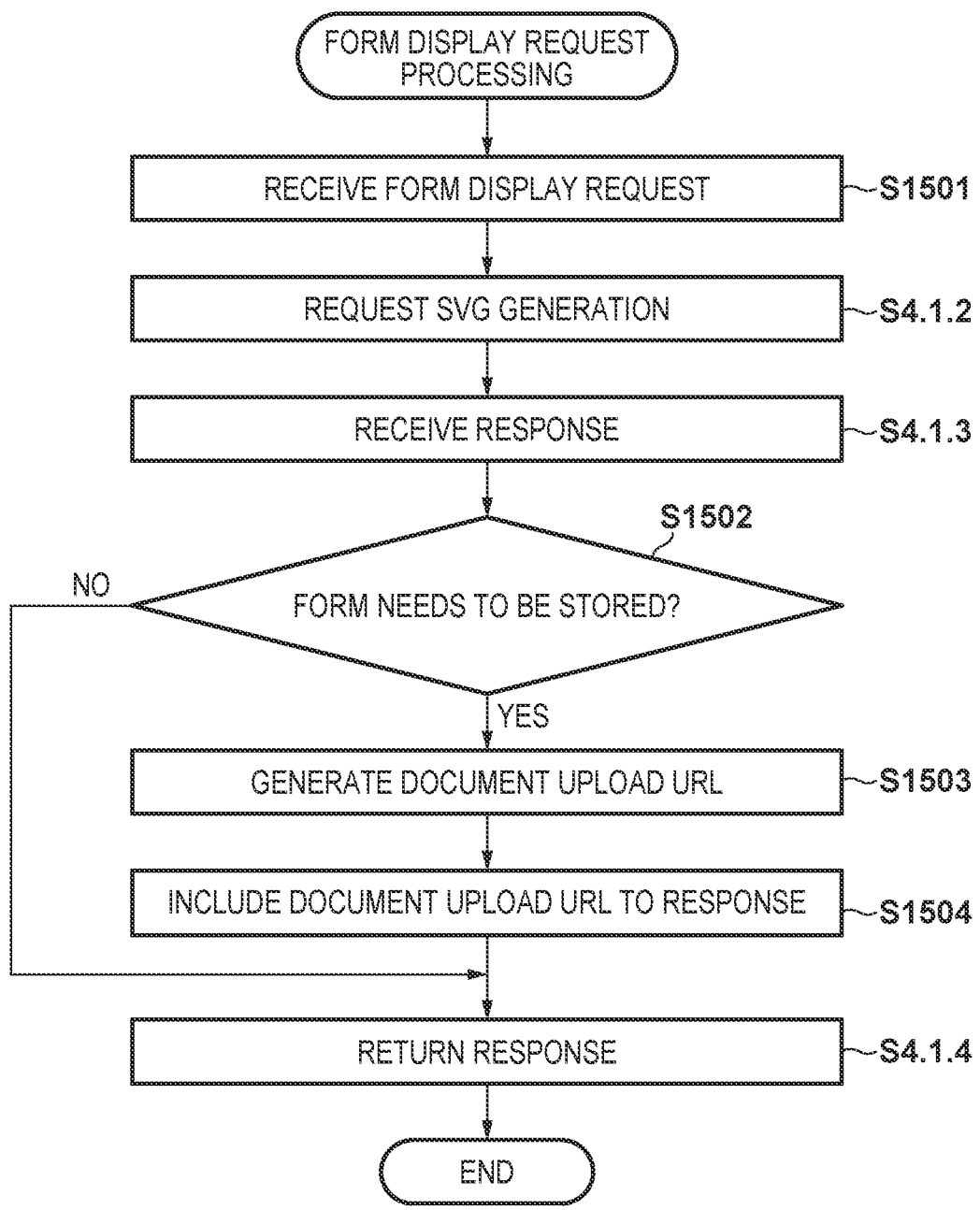
FIG. 15 is a flowchart of form display request processing of a business server according to a third embodiment.

FIG. 15 is a flowchart illustrating the form display request processing in the business server 103 according to the present embodiment. This flow is realized by the CPU 201 of the business server 103 reading a corresponding program from the HDD 204 or the like and executing the program. In the present embodiment, in step S4.1.1, the Web browser 321 of the client terminal 102 starts by transmitting a form preview request to the business server 103. Note, processing corresponding to the flow of FIG. 4 described in the first embodiment are denoted by the same reference numerals.

In step S1501, the business server 103 receives a form preview request from the client terminal 102.

In step S4.1.2, the business information management unit 332 sends the form generation request to the form generation server 104.

In step S4.1.3, the business information management unit 332 receives a response to the form generation request from the form generation server 104.

In step S1502, the business information management unit 332 determines whether or not the form is a form that needs to be stored based on the form ID included in the form preview request received in step S4.1.1. Note, in the present embodiment, whether or not the form needs to be stored (whether to permit storage) is determined for each type of form, and it is assumed that the administrator sets the designation of the type of the form that needs to be stored in the data table of the form information in advance. This data table is held, for example, in the storage unit of the business server 103. If it is determined that the form needs to be stored (YES in step S1502), the processing proceeds to step S1503, and if it is determined that it does not need to be stored (NO in step S1502), the processing proceeds to step S4.1.4.

In step S1503, the business information management unit 332 generates document upload URLs. The document upload URL is a URL for uploading the PDF file for storage generated by the form generation server 104.

In step S1504, the business information management unit 332 includes the document upload URLs generated in step S1503 in the response to the client terminal 102.

In step S4.1.4, the business information management unit 332 returns a response to the form preview request from the client terminal 102. Then, the processing flow ends. Note that when it is determined that storage is not required (NO in step S1502), the document upload URLs are not included in the response.

[Form Data Information Obtainment Request Process]

Figure 16:
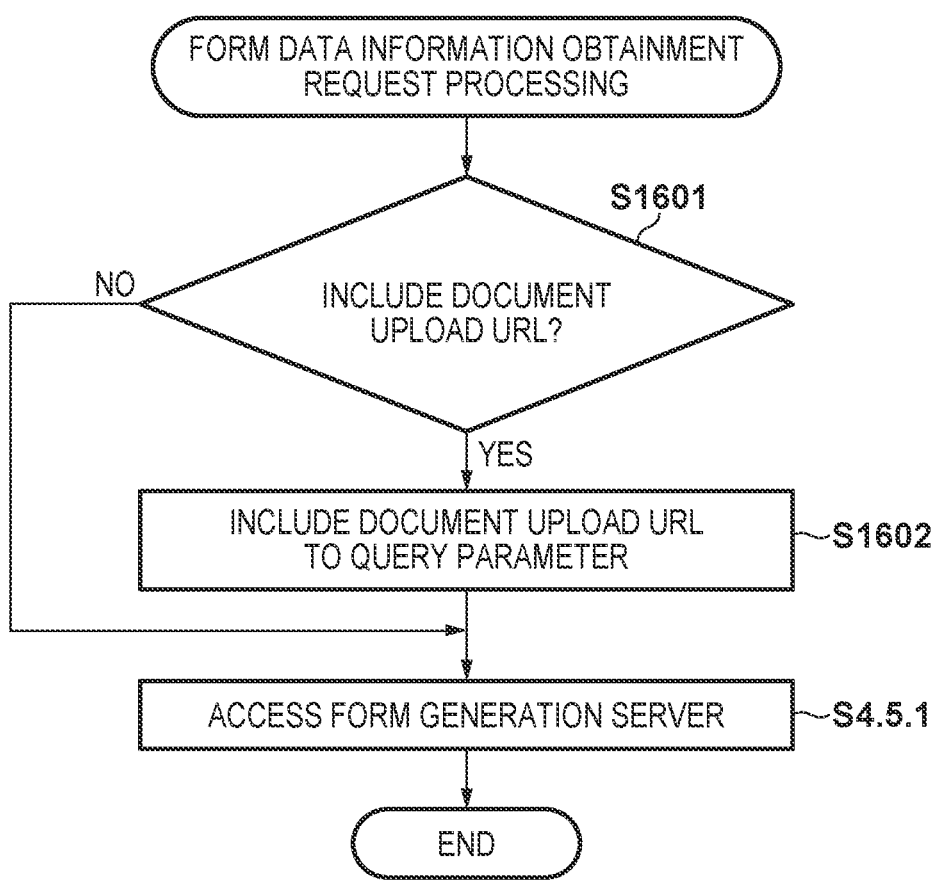
FIG. 16 is a flowchart of processing for requesting obtainment of form data information of the client terminal according to according to the third embodiment.

FIG. 16 is a flowchart illustrating form data information obtainment request processing in the client terminal 102 according to the present embodiment. This flow is realized by the CPU 201 of the client terminal 102 reading a corresponding program from the HDD 204 or the like and executing the program. In the present embodiment, in step S4.1.4, it is started by receiving a response to a form preview request from the business server 103. Note, processing corresponding to the flow of FIG. 4 described in the first embodiment are denoted by the same reference numerals.

In step S1601, the Web browser 321 of the client terminal 102 determines whether the document upload URL is included in the response to the form preview request. If it is determined that a document upload URL is included (YES in step S1601), the processing proceeds to step S1602, and if it is determined that a document upload URL is not included (NO in step S1601), the processing proceeds to step S4.5.1.

In step S1602, the Web browser 321 includes the document upload URL included in the response in the query parameter. Then, the processing proceeds to step S4.5.1.

In step S4.5.1, the Web browser 321 accesses the form generation server 104 and obtains the form data information. Then, the processing flow ends.

[Form Display Processing]

Figure 17:
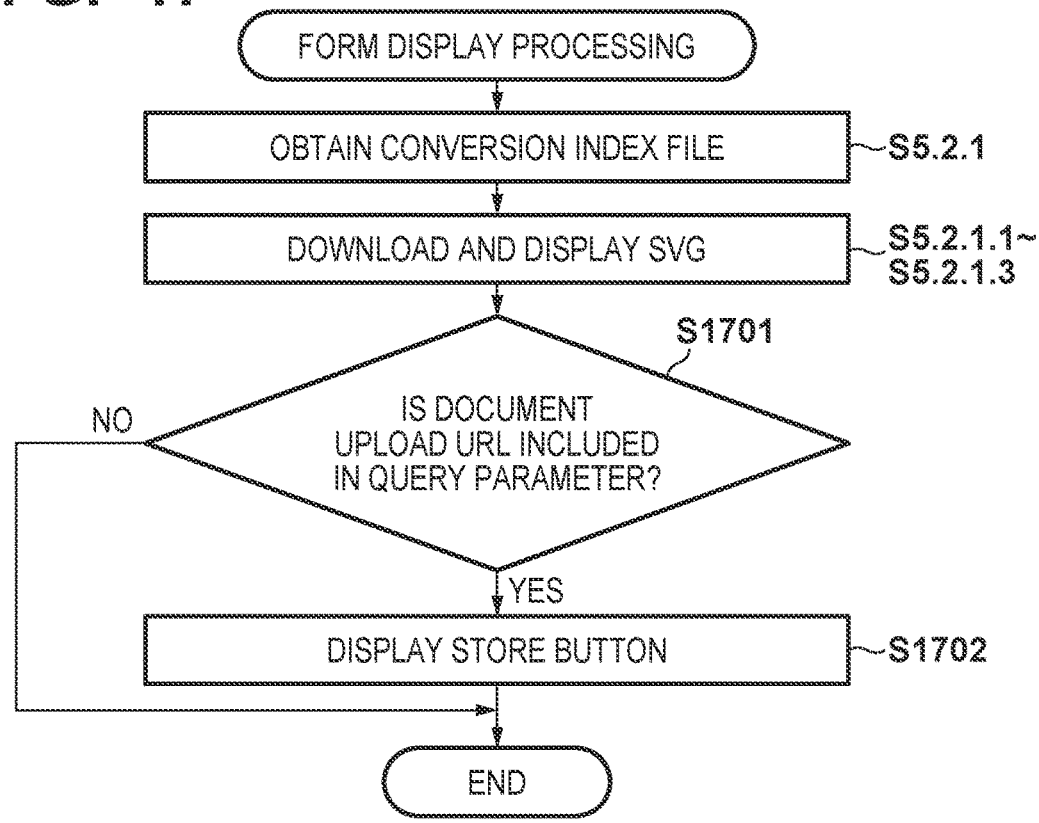
FIG. 17 is a flowchart of processing for displaying a Web form of the client terminal according to the third embodiment.

FIG. 17 is a flowchart illustrating a Web form display processing in the client terminal 102 according to the present embodiment. This flow is realized by the CPU 201 of the client terminal 102 reading a corresponding program from the HDD 204 or the like and executing the program. In this embodiment, the client terminal 102 starts by obtaining the conversion index file URL of the form data information in response to step S4.5.1. Note, in the same processing corresponding to the flow of FIG. 5 described in the first embodiment, the same reference numerals are assigned, and only the different portions are described below.

After the SVG files are downloaded and displayed at step S5.2.1.1 to step S5.2.1.3, in step S1701, it is determined whether the Web browser 321 includes the document upload URLs in a query parameter. If it is determined that a document upload URL is included in the query parameter (YES in step S1701), the processing proceeds to step S1702, and if it is determined that a document upload URL is not included in the query parameter (NO in step S1701), this processing flow ends. That is, when it is determined that the query parameter does not include the document upload URL, the store button 1030 is not displayed on the Web form screen 1000, and the user cannot request the storage processing. Note, configuration may be such that the store button 1030 may be displayed and controlled in a state as not to be pressed.

In step S1702, the Web browser 321 displays the store button 1030 on the Web form screen 1000. Then, this processing flow ends.

[Form Storage Request Processing]

Figure 18:
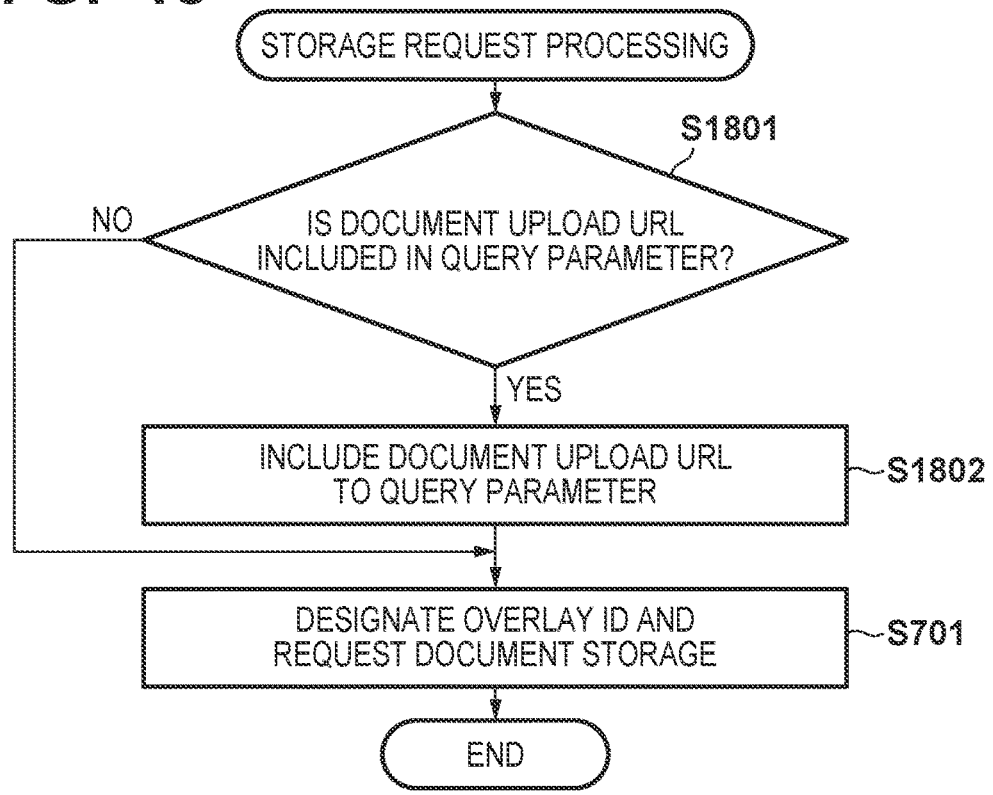
FIG. 18 is a flowchart of form storage request processing of the client terminal according to the third embodiment.

FIG. 18 is a flowchart illustrating the form storage request processing in the client terminal 102 according to the present embodiment. This flow is realized by the CPU 201 of the client terminal 102 reading a corresponding program from the HDD 204 or the like and executing the program. In the present embodiment, the user presses the store button 1030 provided on the Web form screen 1000 displayed on the Web browser 321 to start the operation. Note, in the same processing as in FIG. 7 described in the first embodiment, the same reference numerals are assigned, and only the different portions are described below.

In step S1801, when the user presses the store button 1030, the Web browser 321 of the client terminal 102 determines whether or not a document upload URL is included in the query parameter. If it is determined that a document upload URL is included in the query parameter (YES in step S1801), the processing proceeds to step S1802, and if it is determined that a document upload URL is not included in the query parameter (NO in step S1801), the processing proceeds to step S701.

In step S1802, the Web browser 321 includes the document upload URL in the form storage request. Thereafter, the processing proceeds to step S701.

In step S701, the Web browser 321 transmits the form storage request to the form generation server 104. Then, the processing flow ends. Note, when it is determined that the document upload URL is not included, the document upload URL is not included the form storage request.

[Form Storage Processing]

Figure 19:
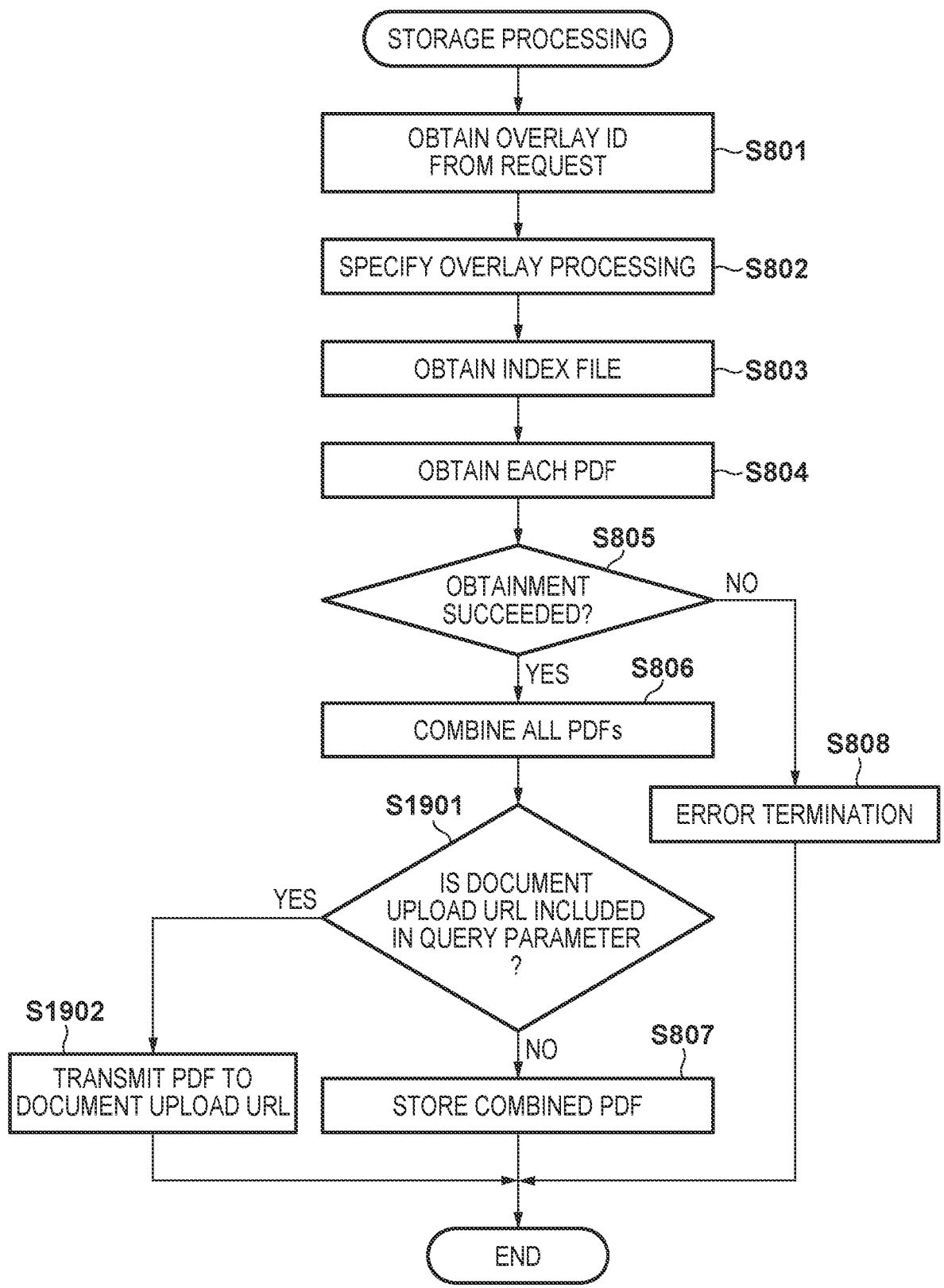
FIG. 19 is a flowchart of form storage processing of a form generation server according to the third embodiment.

FIG. 19 is a flowchart illustrating the form storage processing in the form generation server 104 according to the present embodiment. This flow is realized by the CPU 201 of the form generation server 104 reading a corresponding program from the HDD 204 or the like and executing the program. In the present embodiment, the form generation server 104 is started in response to receiving a form storage request transmitted from the client terminal 102. Note, in the same processing as in FIG. 8 described in the first embodiment, the same reference numerals are assigned, and only the different portions are described below.

In step S806, the storage document generation unit 344 of the form generation server 104 combines all the PDF files obtained in step S804 in the order of pages.

In step S1901, the storage document generation unit 344 determines whether or not the form storage request received from the client terminal 102 includes the document upload URL. If it is determined that a document upload URL is included in the form storage request (YES in step S1901), the processing proceeds to step S1902, and if it is determined that a document upload URL is not included in the form storage request (NO in step S1901), the processing proceeds to step S807.

In step S1902, the storage document generation unit 344 transmits the PDF file combined in step S806 to the location indicated by the document upload URL. Then, the processing flow ends.

In step S807, the storage document generation unit 344 stores the PDF files combined in step S806 in the life cycle management region of the storage server 106. Then, the processing flow ends.

As described above, according to the present embodiment, in addition to the effect of the first embodiment, by displaying the store button on the Web form screen only when a form document needs to be stored, and disabling the storing operation when a form document does not need to be stored, it is possible to suppress a form document from being unintentionally stored.

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-198710, filed Oct. 22, 2018, which is hereby incorporated by reference herein in its entirety.

What is claimed is:

1. A document generation system comprising:
at least one memory configured to store instructions; and
at least one processor configured to execute the instructions stored in the at least one memory to cause the document generation system to implement:
a generation unit configured to generate a plurality of form data of a first file format from document data;
a conversion unit configured to convert the plurality of form data of the first file format into a plurality of form data of a second file format;
a display control unit configured to cause a display unit to display the plurality of form data of the second file format converted by the conversion unit so as to be able to accept a storage request;
a storage control unit configured to, in response to accepting a storage request for the plurality of form data of the second file format displayed on the display unit, combine the plurality of form data of the first file format generated from the document data and corresponding to the plurality of form data of the second file format displayed on the display unit into data of the first file format and store the combined data in a storage unit; and
a determination unit configured to determine whether or not to store document data based on a type of the document data,
wherein the display control unit controls such that the storage request cannot be accepted when the display unit causes display of form data of the second file format corresponding to document data determined to be unstorable by the determination unit.

2. The document generation system according to claim 1, wherein the display unit is a Web browser of a client terminal, and
the storage request is carried out by a store button displayed on the Web browser being pressed.

3. The document generation system according to claim 1 wherein the at least one processor is configured to execute the instructions stored in the at least one memory to cause the document generation system to further implement a designation unit configured to accept designation of document data, and
wherein the generation unit generates the plurality of form data of the first file format from document data for which designation was accepted by the designation unit.

4. The document generation system according to claim 1 wherein the at least one processor is configured to execute the instructions stored in the at least one memory to cause the document generation system to further implement an accepting unit configured to accept designation of form data to be stored from among the plurality of form data of the second file format displayed on the display unit, and
wherein the storage control unit combines the form data of the first file format corresponding to the form data accepted by the accepting unit into data of the first file format and stores the combined data in the storage unit.

5. The document generation system according to claim 1, wherein the plurality of form data of the first file format generated by the generation unit are stored in a storage region in which stored data is automatically deleted after a predetermined time has elapsed, and the plurality of form data of the second file format converted by the conversion unit are stored in the storage region in which stored data is automatically deleted after the predetermined time has elapsed, and
the combined data of the first file format stored in the storage unit is stored until a deletion instruction is carried out by a user.

6. The document generation system according to claim 1, wherein the first file format is a PDF (Portable Document Format) format, and
the second file format is an SVG (Scalable Vector Graphics) format.

7. The document generation system according to claim 1, wherein the generation unit, the conversion unit, the display unit, and the storage unit are each provided in different devices.

8. A method of controlling a document generation system comprising:
generating a plurality of form data of a first file format from document data;
converting the plurality of form data of the first file format into a plurality of form data of a second file format;
providing the plurality of form data of the second file format to be displayed on a display unit so as to be able to accept a storage request;

combining, in response to accepting a storage request for the plurality of form data of the second file format displayed on the display unit, the plurality of form data of the first file format generated from the document data and corresponding to the plurality of form data of the second file format displayed on the display unit into data of the first file format and storing the combined data in a storage unit; and determining whether or not to store document data based on a type of the document data, wherein the storage request cannot be accepted when form data of the second file format corresponding to document data determined to be unstorable is displayed.

9. A non-transitory computer-readable storage medium storing a program for causing one or more computer to function as a document generation system, comprising:

a generation unit configured to generate a plurality of form data of a first file format from document data;

a conversion unit configured to convert the plurality of form data of the first file format into a plurality of form data of a second file format;

a display control unit configured to cause a display unit to display the plurality of form data of the second file format converted by the conversion unit so as to be able to accept a storage request;

a storage control unit configured to, in response to accepting a storage request for the plurality of form data of the second file format displayed on the display unit, combine the plurality of form data of the first file format generated from the document data and corresponding to the plurality of form data of the second file format displayed on the display unit into data of the first file format and store the combined data in a storage unit; and a determination unit configured to determine whether or not to store document data based on a type of the document data, wherein the display control unit controls such that the storage request cannot be accepted when the display unit causes display of form data of the second file format corresponding to document data determined to be unstorable by the determination unit.

* * * * *